Figure 3:
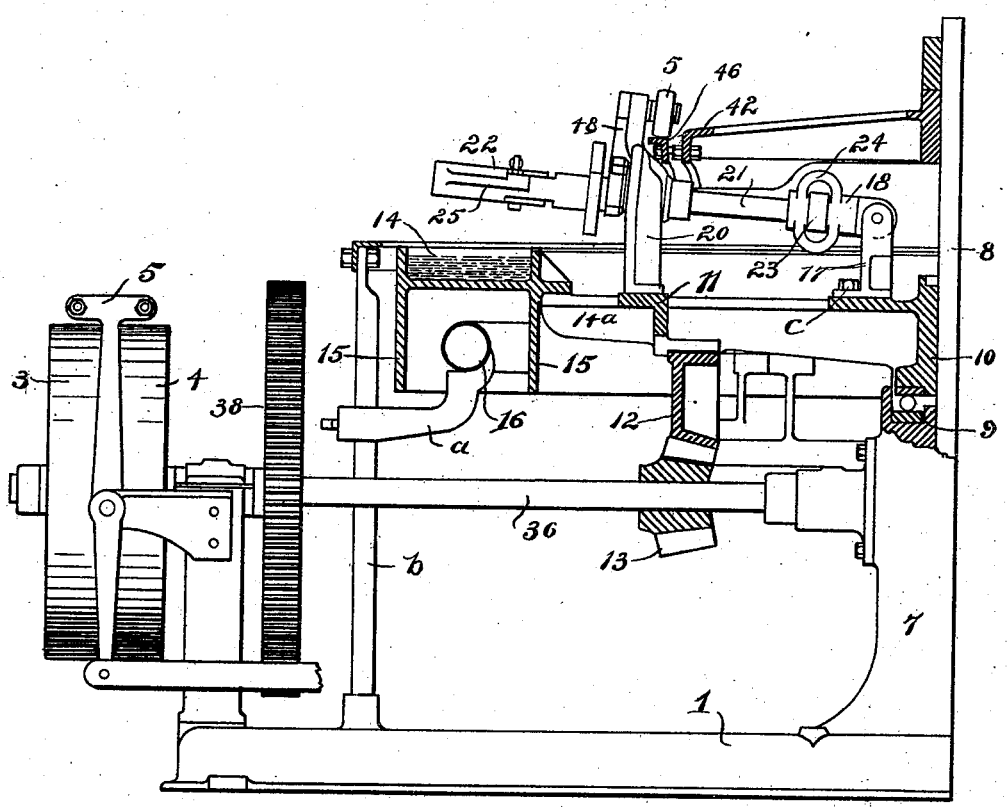

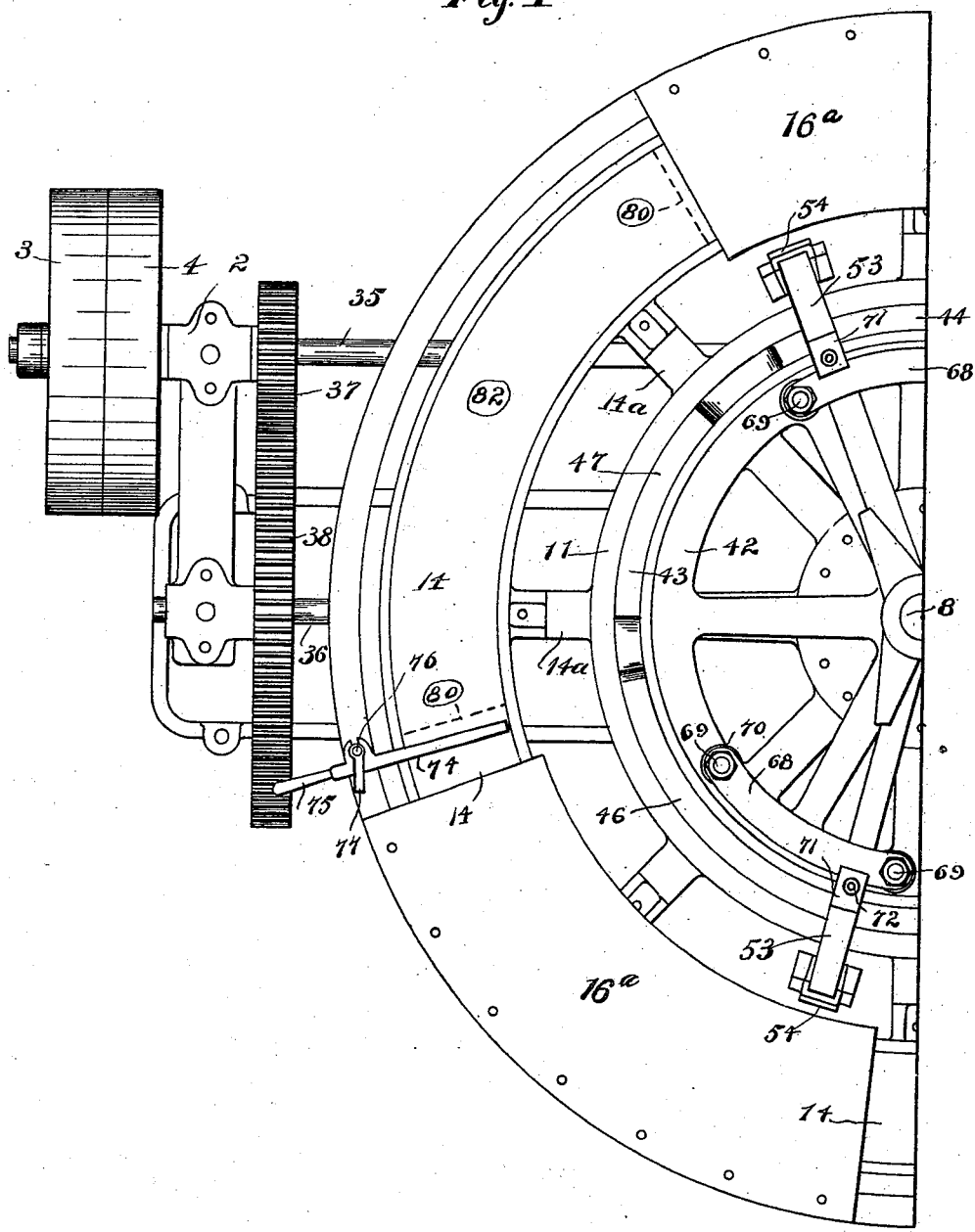

No. 695,516. Patented Mar. 18, 1902.
G. WILCOX.
CAN DIPPING MACHINE.
(Application filed July 16, 1900. Renewed Oct. 29, 1901.)
(No Model.) 13 Sheets—Sheet 2.
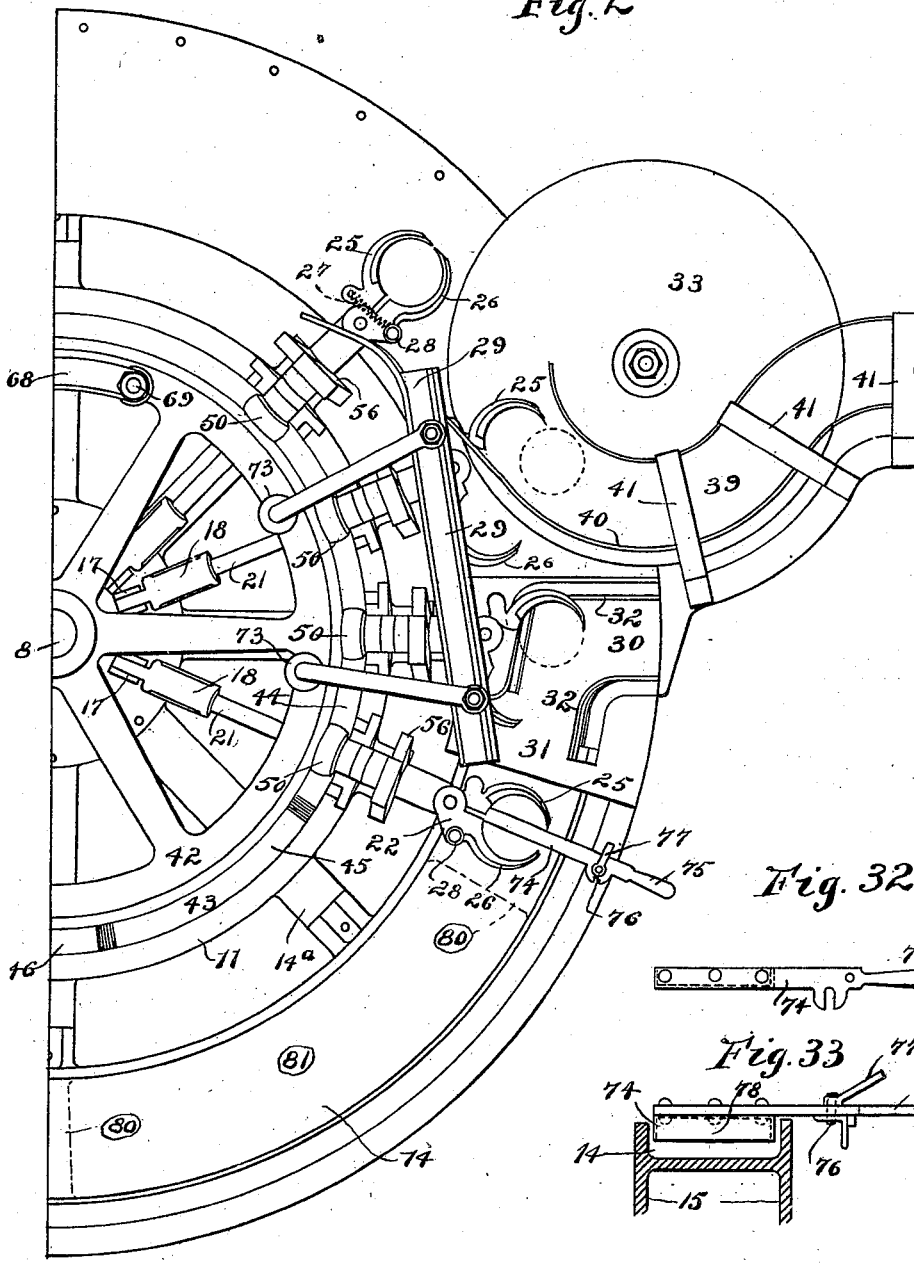
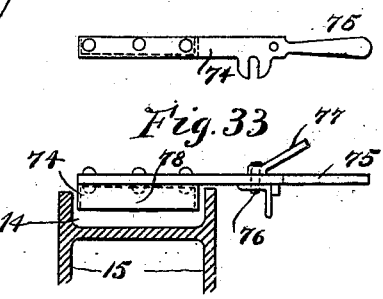

No. 695,516. Patented Mar. 18, 1902.
G. WILCOX.
CAN DIPPING MACHINE.
(Application filed July 16, 1900. Renewed Oct. 29, 1901.)

(No Model.) 13 Sheets—Sheet 3.

Witnesses:
G. S. Noble
J. D. McMahon.

Inventor,
George Wilcox
By Joseph G. Parkinson,
Att'y.

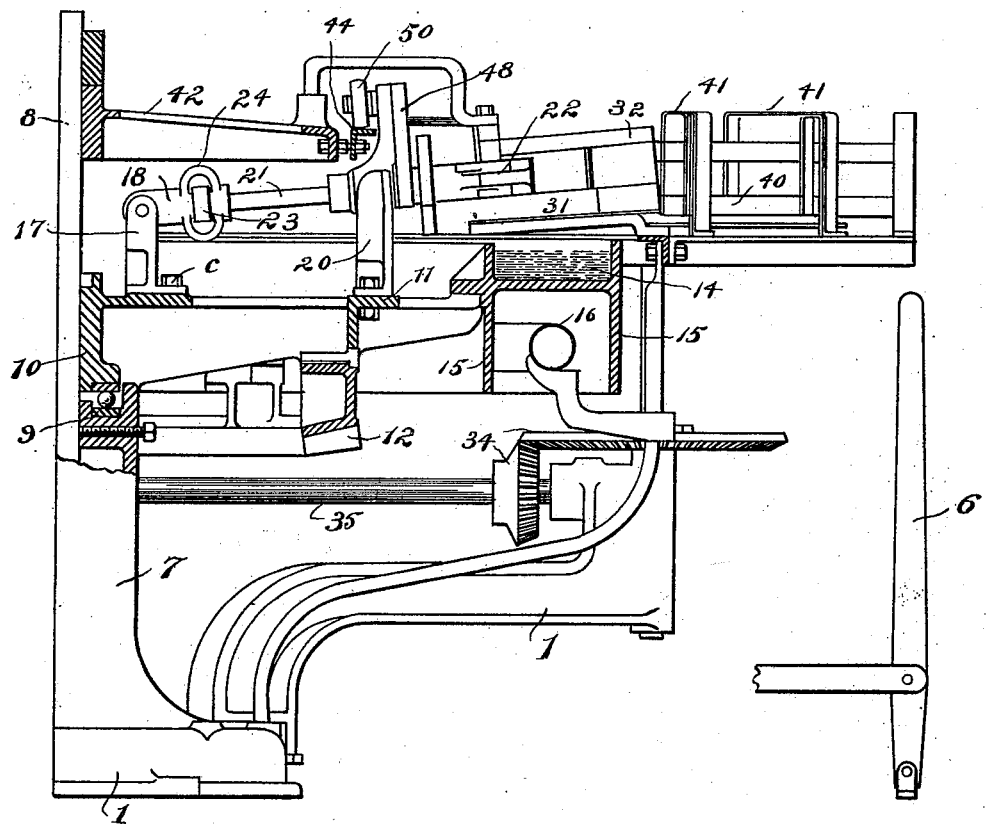

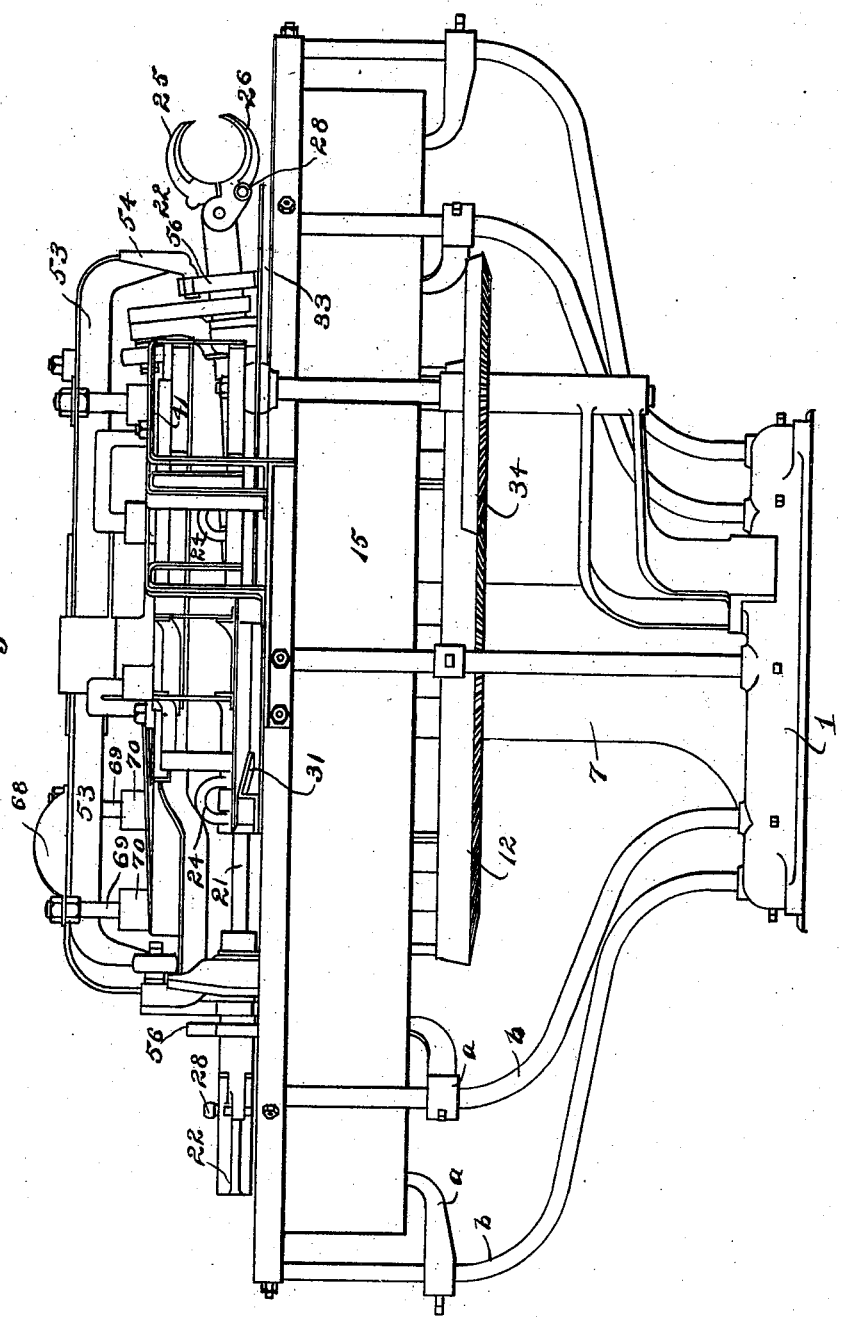

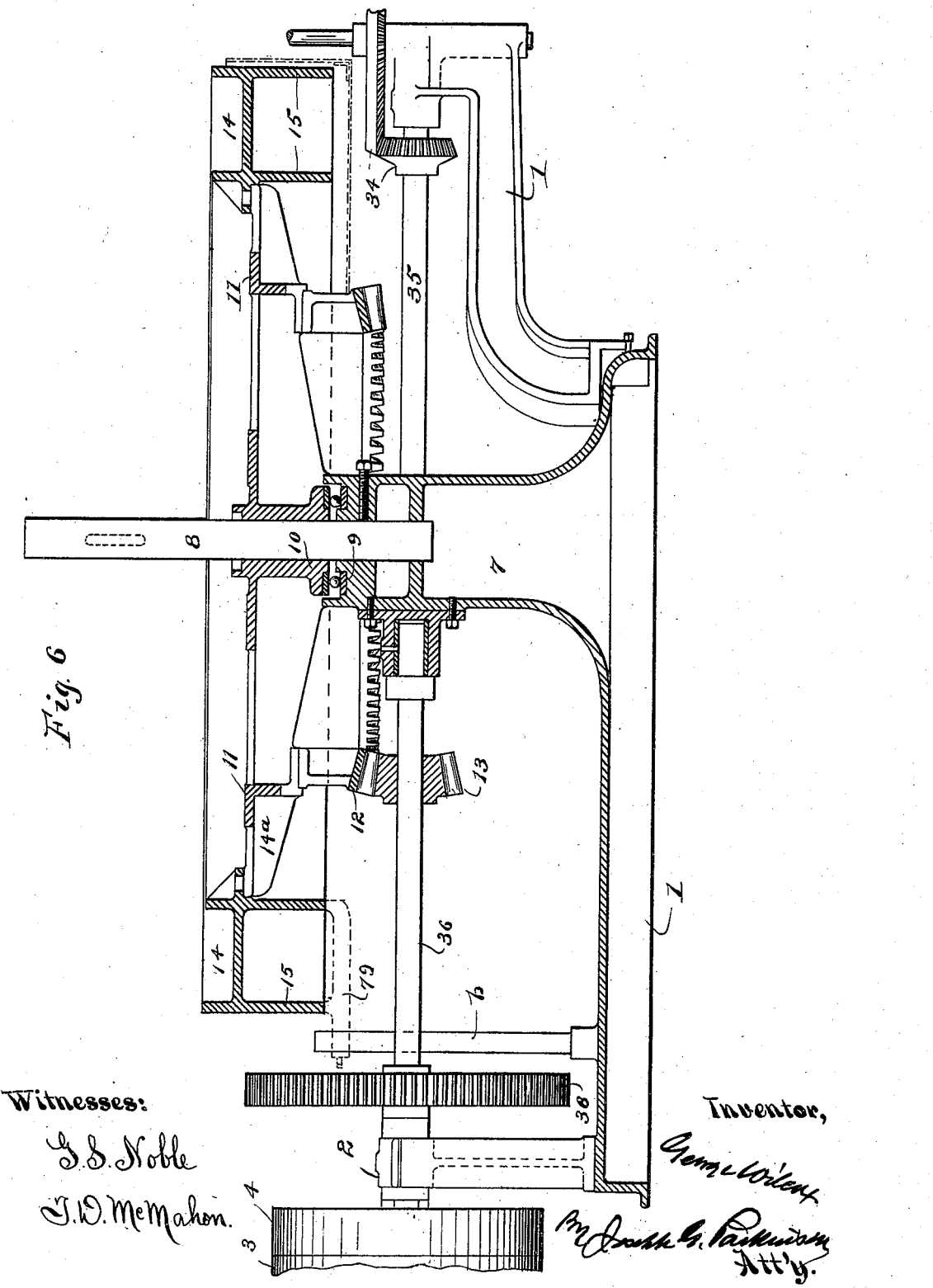

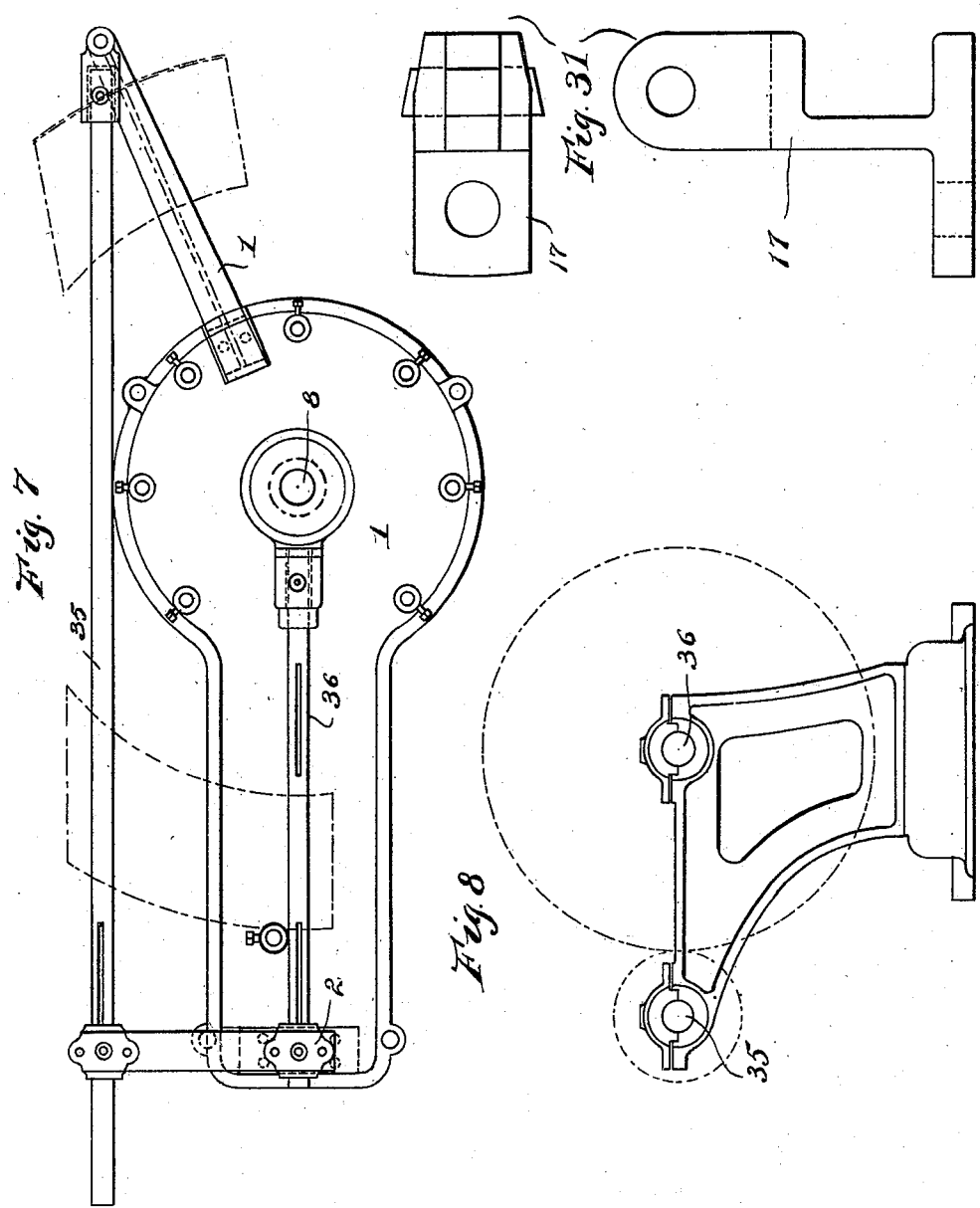

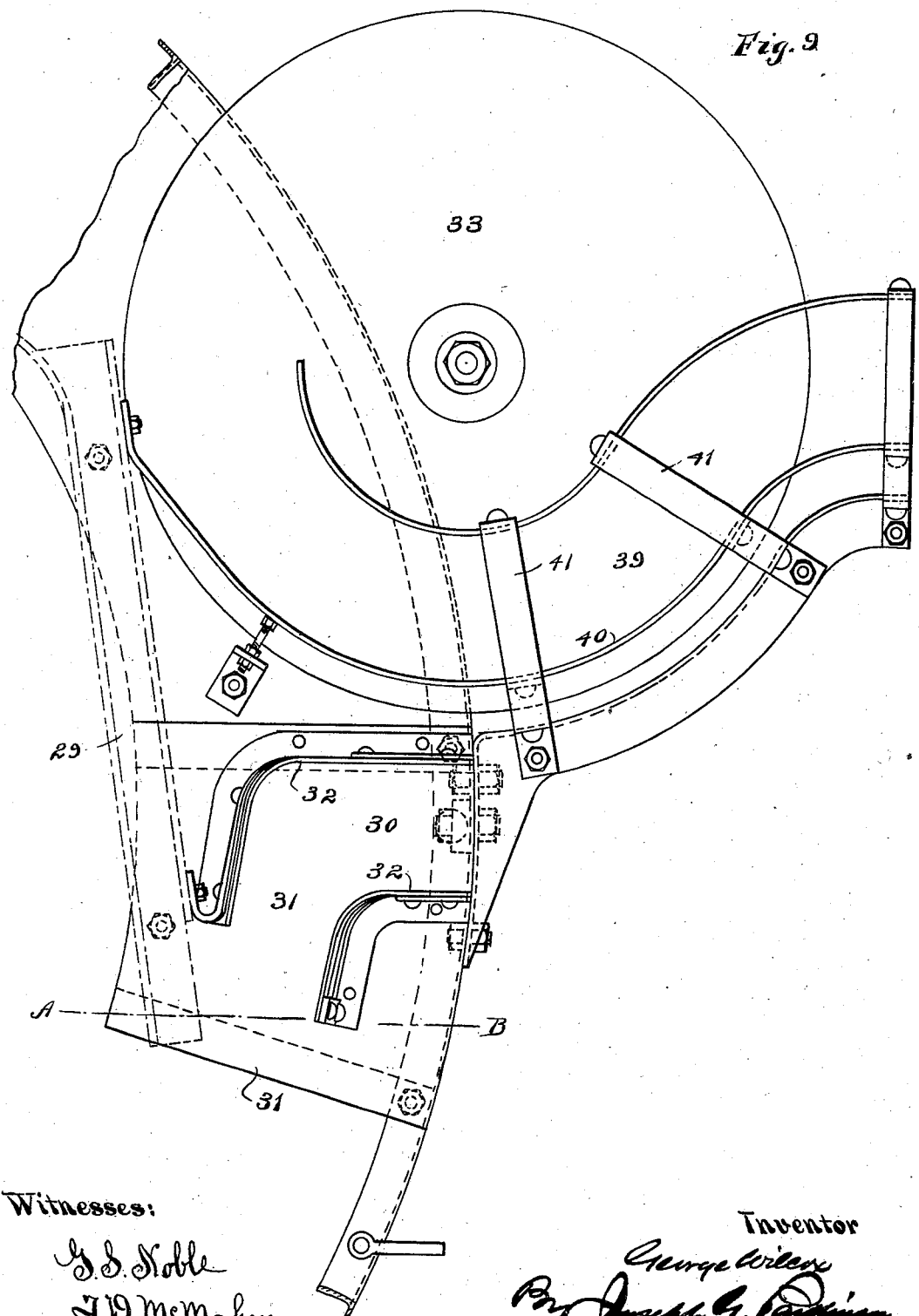

No. 695,516. Patented Mar. 18, 1902.
G. WILCOX.
CAN DIPPING MACHINE.
(Application filed July 16, 1900. Renewed Oct. 29, 1901.)
(No Model.) 13 Sheets—Sheet 9.

Witnesses:
G. S. Noble
J. W. McMahon.

Inventor,
George Wilcox
By Joseph G. Parkinson
Att'y.

No. 695,516. Patented Mar. 18, 1902.
G. WILCOX.
CAN DIPPING MACHINE.
(Application filed July 16, 1900. Renewed Oct. 29, 1901.)
(No Model.) 13 Sheets—Sheet 10.

Witnesses:
G. S. Noble
J. D. McMahon

Inventor,
George Wilcox
By Jesse G. Parkinson
Att'y.

No. 695,516. Patented Mar. 18, 1902.
G. WILCOX.
CAN DIPPING MACHINE.
(Application filed July 16, 1900. Renewed Oct. 29, 1901.)
(No Model.) 13 Sheets—Sheet 11.
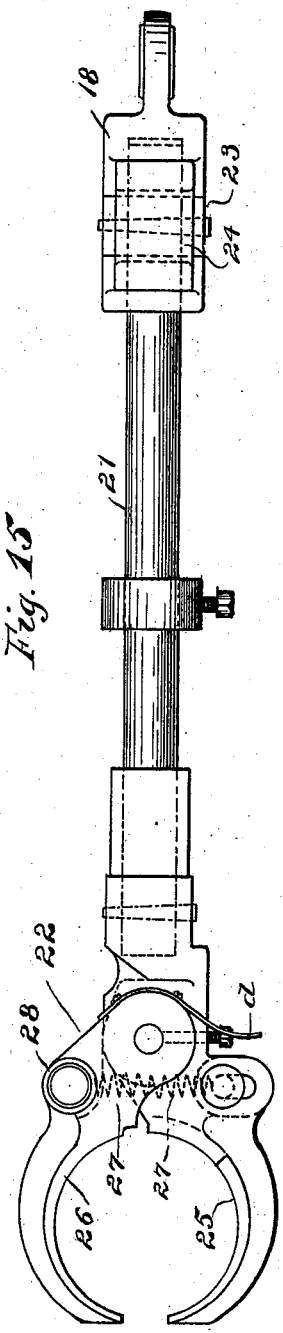
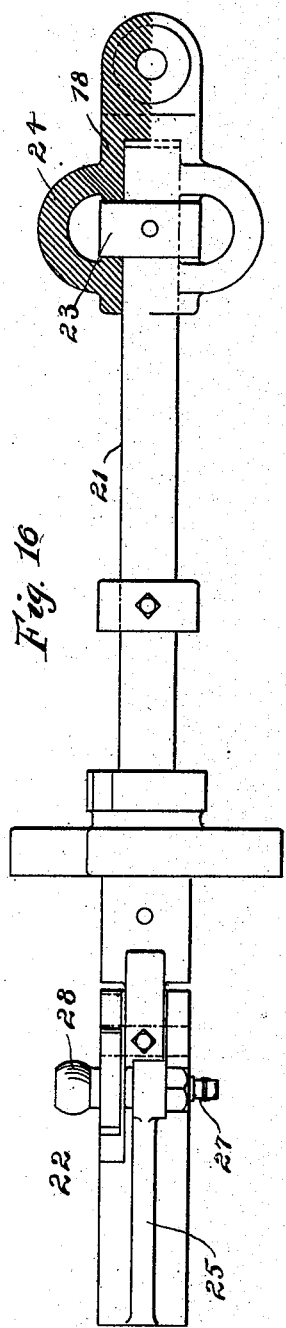
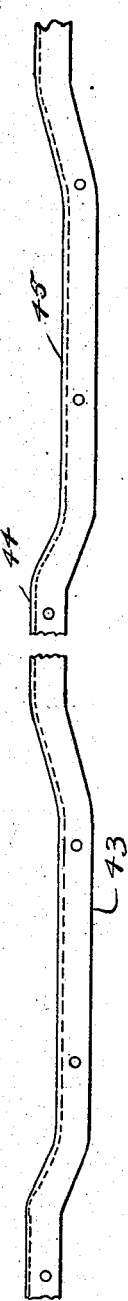
Witnesses:
G. S. Noble
J. W. McMahon.
Inventor,
George Wilcox
By Joseph G. Rasmussen
Att'y.

No. 695,516. Patented Mar. 18, 1902.
G. WILCOX.
CAN DIPPING MACHINE.
(Application filed July 16, 1900. Renewed Oct. 29, 1901.)
(No Model.) 13 Sheets—Sheet 12.
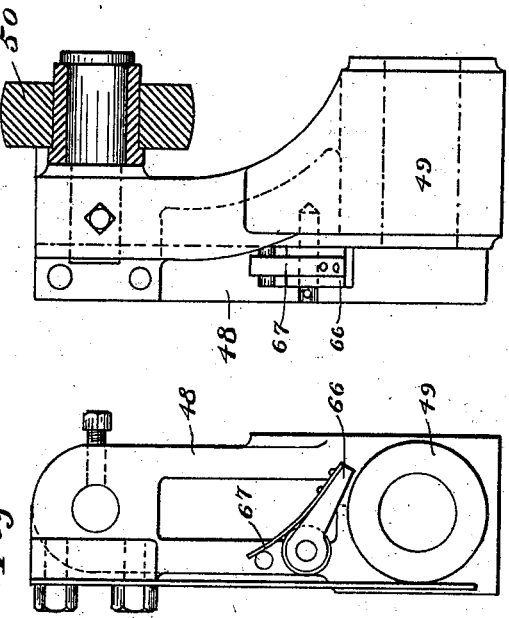
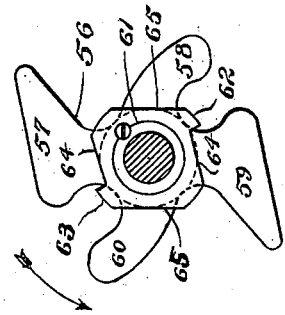
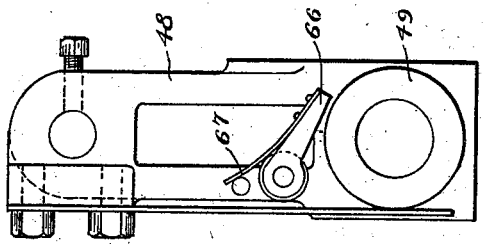
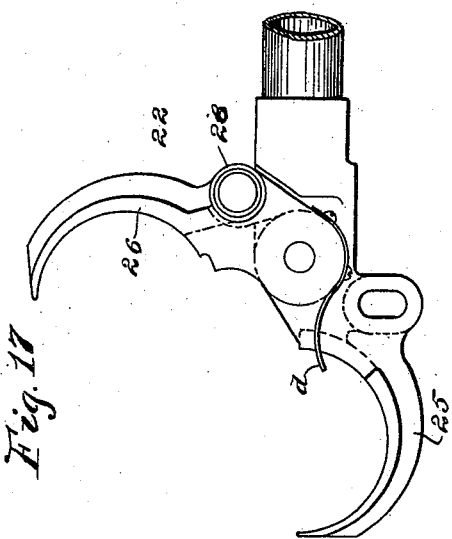
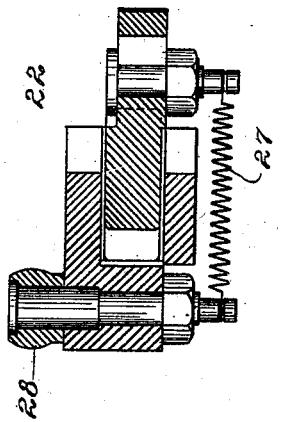
Witnesses:
G. S. Noble
J. D. McMahon.
Inventor,
George Wilcox
By Joseph G. Parkinson
Att'y.

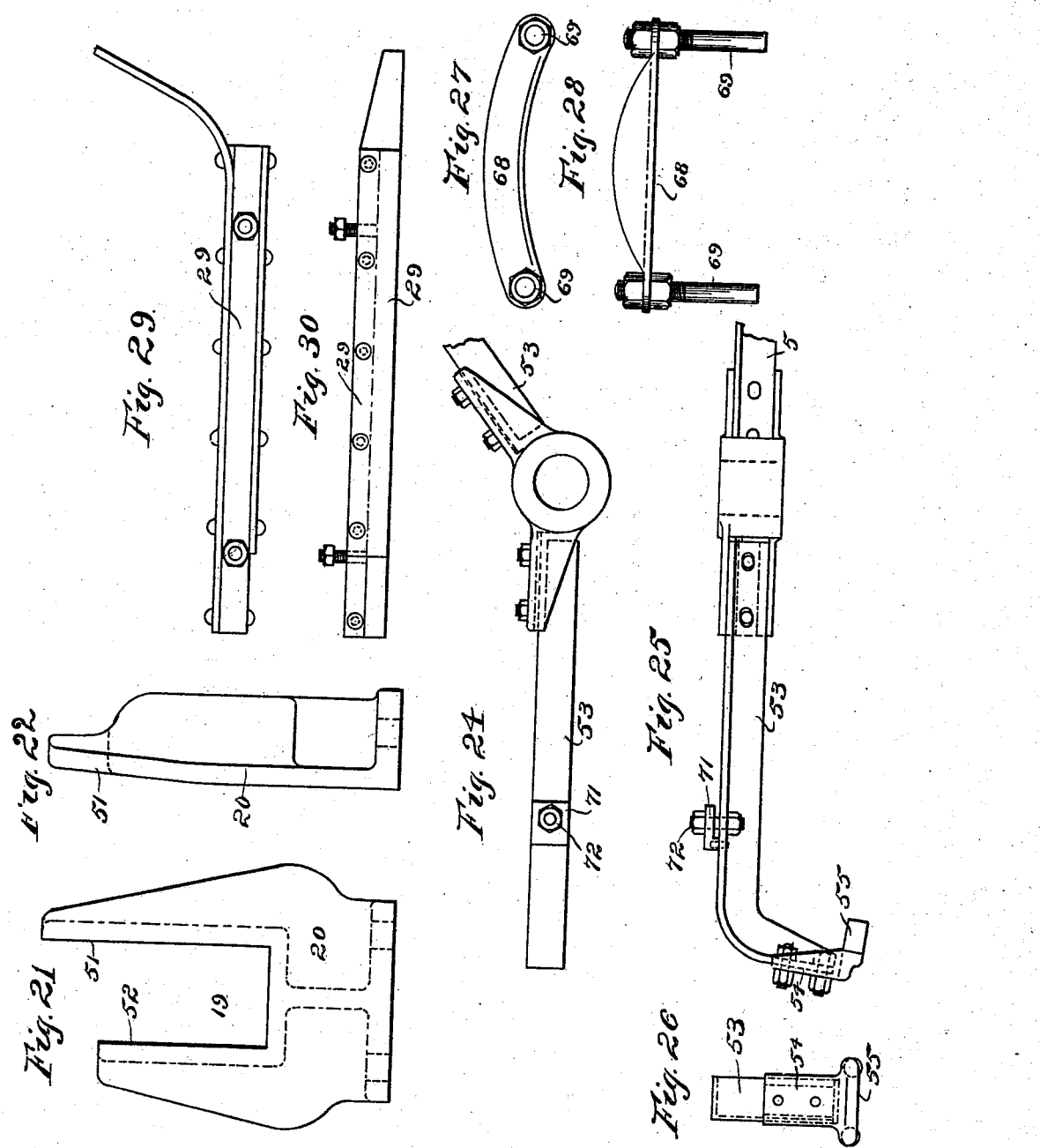

UNITED STATES PATENT OFFICE.

GEORGE WILCOX, OF LOS ANGELES, CALIFORNIA, ASSIGNOR TO AMERICAN CAN COMPANY, OF JERSEY CITY, NEW JERSEY, A CORPORATION OF NEW JERSEY.

CAN-DIPPING MACHINE.

SPECIFICATION forming part of Letters Patent No. 695,516, dated March 18, 1902.

Application filed July 16, 1900. Renewed October 29, 1901. Serial No. 80,458. (No model.)

*To all whom it may concern:*

Be it known that I, GEORGE WILCOX, a citizen of the United States, residing at Los Angeles, in the county of Los Angeles and State of California, have invented certain new and useful Improvements in Can-Dipping Machines, of which the following is a specification.

My invention has for its object to provide automatic mechanism whereby can-bodies, after the side seams have been closed and soldered and before the heads have been applied, may be received and dipped, as to one end, into a bath of flux, molten solder, or other material, reversed and dipped, as to the other end, and again reversed and finally discharged; and it consists in combining with a trough for holding a bath of solder or other material traveling grippers which receive and grasp the can-bodies, mechanism whereby said grippers are caused to approximate the bath of solder, dip the ends of the cans therein, and then depart therefrom, mechanism for reversing the grippers after such dipping operation, and mechanism for opening the grippers at the end of their traverse to release said bodies, in combining with said grippers and discharge-way a rotating discharge-table forming a flooring to said way, and in various other combinations and details of construction, hereinafter pointed out and claimed.

Figure 10:
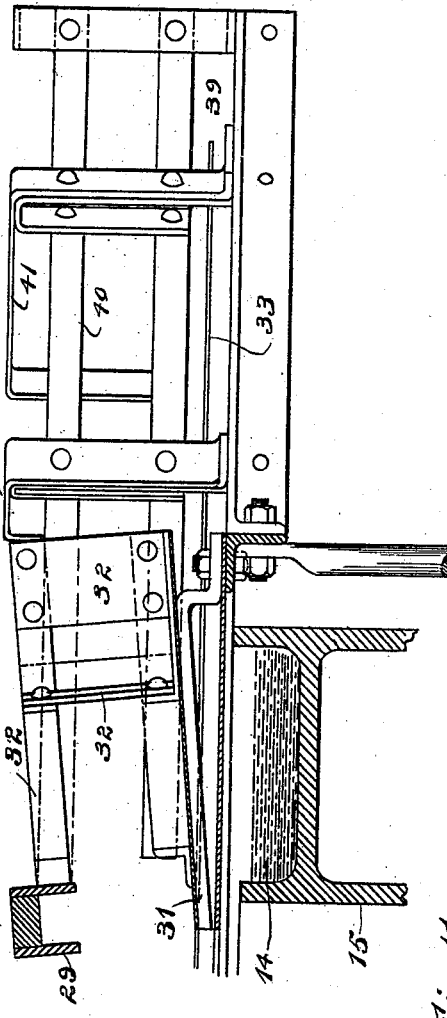
Figure 11:
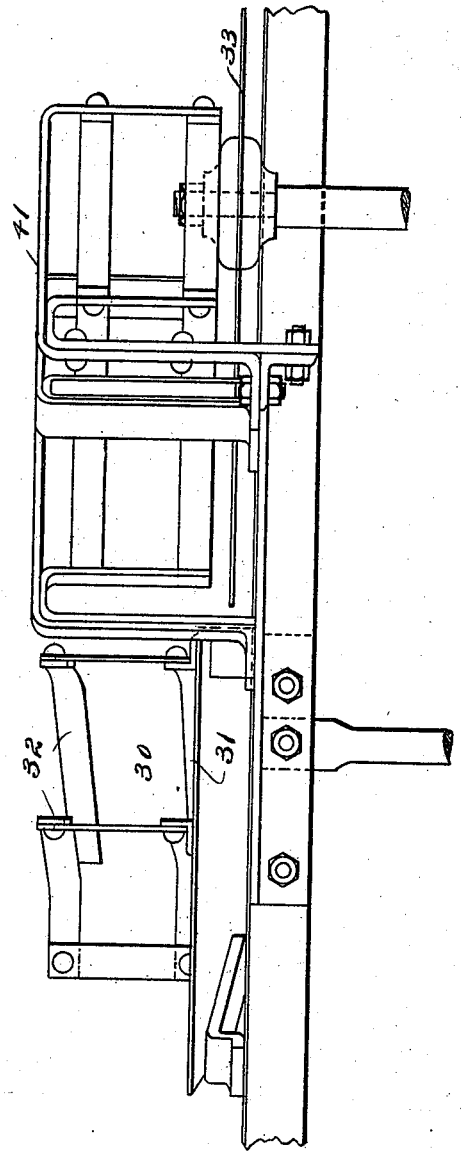
Figure 12:
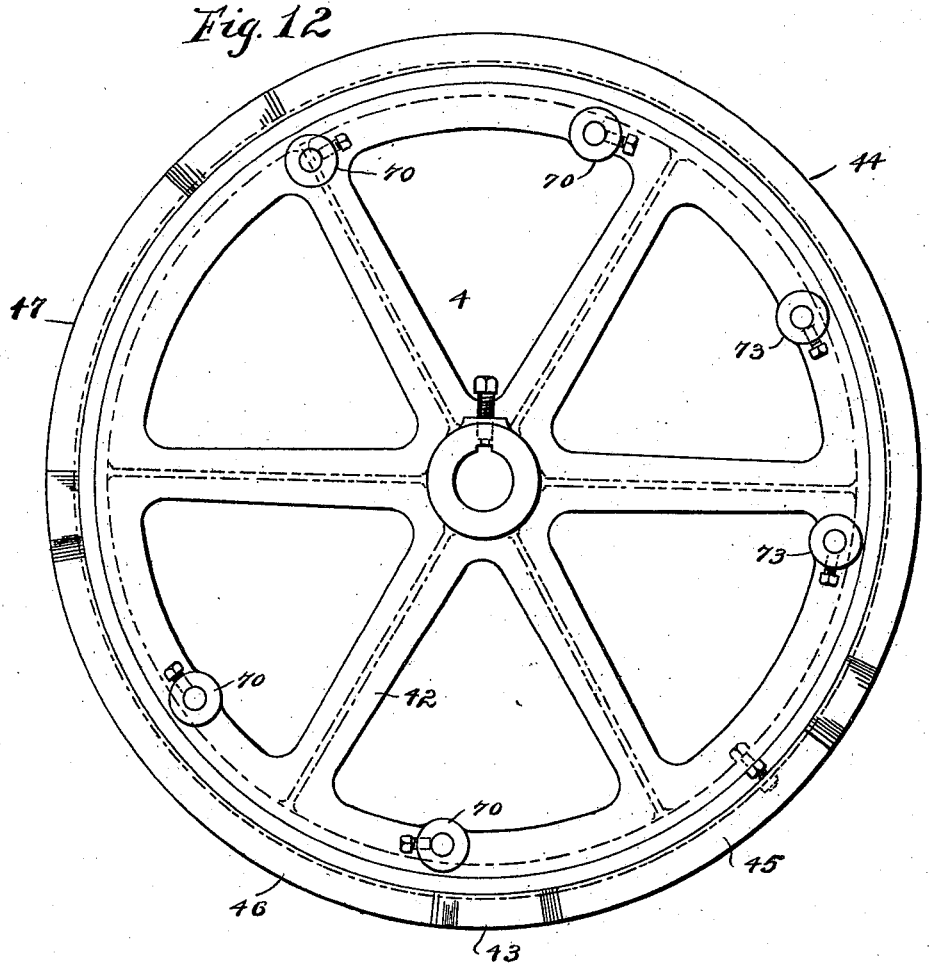
Figure 13:
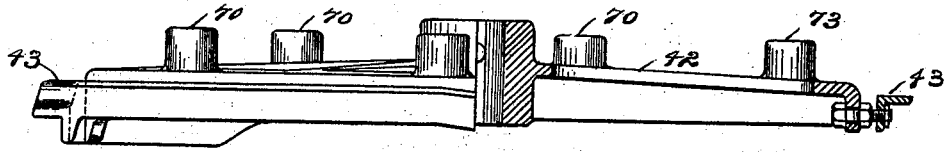

In the drawings, Figure 1 is a top plan view of what will be conventionally termed the "left-hand half" of a machine embodying my invention, and Fig. 2 is the right-hand counterpart thereof. Fig. 3 is a side elevation of the left-hand half of the machine shown in the preceding figures, and Fig. 4 the right-hand counterpart thereof. Fig 5 is a side elevation ninety degrees removed from the foregoing of the entire machine. Fig. 6 is a sectional elevation of said machine on the line of the main or driving shaft, largely dismantled; Fig. 7, a top plan view embracing the bed-plate and shafting of the machine, and Fig. 8 an elevation of the base-plate and gearing at the left-hand end of the machine. Fig. 9 is an enlarged top plan view, detached, of the apparatus for the introduction and discharge of the can-bodies; Fig. 10, a sectional side elevation of said apparatus on the line A B of Fig. 9, and Fig. 11 a front elevation thereof. Fig. 12 is a top plan view, reduced, of the gripper, cam-track, and its spider; Fig. 13, a side elevation thereof, partly broken away, without reduction; and Fig. 14 a projection of said cam-track still further reduced, the lower reach being a continuation of that shown above in said figure. Figs. 15 to 18 are enlarged details of the grippers; Figs. 19 and 20, enlarged details of the floating bearings for said grippers; Figs. 21 and 22, enlarged details of the guide-brackets for said floating bearings, and Fig. 23 an enlarged detail of the rocker-cam for the gripper-shafts. Figs. 24 and 25 are enlarged details of the pin racks or stops and their adjustable arms for operating said rocker-cam; Fig. 26, an outer end elevation thereof; and Figs. 27 and 28, respectively, a top plan view and inner side elevation of the segments along which said stop-arms are adjustable. Fig. 29 is a top plan view, and Fig. 30 a side elevation, enlarged, of the gripper-opening cam; Fig. 31, enlarged details in side elevation and plan of one of the swivel-brackets for the gripper-arms; and, finally, Figs. 32 and 33 are details of the skimmer for clearing the revolving solder-bath.

Referring now to said drawings, 1 indicates a strong base frame or casting having bearings 2 for a horizontal main or driving shaft 35, upon which are fast and loose pulleys 3 and 4, coacted with by a shipper 5, controlled by a lever 6 at the right-hand side of the machine, as shown in Fig. 4, or that side into which the can-bodies are fed and from which in the specific mechanism serving as an exponent of my invention they are discharged.

From the base-frame rises a heavy nave 7, and from the nave rises a vertical spindle 8, rigidly affixed thereto, so that it may serve both as a journal for revolving parts and a support for fixed parts. Upon the crown of the nave is formed a raceway 9 for ball-bearings supporting the hub 10 of a revolving carrier or table 11, driven by the engagement of a bevel-gear 12 upon its under side, with a bevel-pinion 13 on the inner end of a counter-shaft 36, receiving its motion from the main shaft by pinion 37 and gear 38, whereby its speed is reduced from that of the main shaft.

An annular solder-trough 14 is carried upon the machine, and as I deem that the best results are effected and the most rapid work accomplished by keeping the grippers in continuous movement instead of stopping them for the dipping operation and starting them again thereafter, and as it is desirable that the bath and the grippers should be stationary relatively to each other so far as lateral horizontal movement is concerned at the moment of dipping, I prefer to so mount this trough as that it shall rotate coördinately with the horizontal rotation of the grippers and gripper-arms next below described. To this end it is bolted concentrically with the fixed spindle rising from the nave to lugs 14$^a$, outsetting from the rim of the revolving carrier. Curtains 15, depending from the bottom of this trough, form a bottomless combustion-chamber therebeneath for the reception of the burner-pipe 16, supported on brackets $a$, adjustable up and down on standards $b$ from the base-plate and by which the contents of the trough are kept in a molten state. To shield the cans from the heat of the molten solder after they are lifted from the bath and being inverted and while they are being carried on to the next dipping operation or to the discharge-point, shields 16$^a$ are arranged above the bath at appropriate intervals. I have not, however, found these absolutely essential.

Near the center of the revolving carrier, on the upper face thereof, is a concentric series of swivel-brackets 17, Figs. 2-4 and 31, each secured by a single bolt $c$ and to which are pivoted by horizontal pins a series of sleeve-arms 18, radiating outward from the axis of the carrier and ultimately directed and braced in their play at their free ends by vertical sockets 19 in guide-brackets 20, Figs. 21, 22, fixed equidistant apart upon the outer rim of the revolving carrier. Each of these sleeve-arms, of which in the present machine there are sixteen, receives the shaft 21 of a pair of grippers 22 and permits the rotation of said shaft and grippers. Collars 23, Figs. 15 to 18, pinned to the inner ends of these shafts in loops 24, formed in the arms, prevent relative endwise play or withdrawal of said shafts.

The grippers 22 are located immediately over the solder-trough, so that as the carrier revolves they will accompany it in its circuit. Each gripper has one fixed semicircular jaw 25, rigid with its shaft, and which may be termed the "rear" jaw, and a second semicircular jaw 26, hereinafter termed the "movable" jaw or "front" jaw, pivoted to the shank of the first and normally closed thereto ward by the force of a strong spring 27, extending from the shank of one jaw to the shank of the other.

An antifriction-roller 28 is mounted upon an upstanding pin from the shank of the movable jaw, and at the discharge-point in the circuit at the right-hand side of the machine this roller enters an overhead camway 29, which is simply a straight channeled track arranged as a chord to the arc described by the grippers from the point of discharge to the point of reception. The effect of this camway acting upon the roller, which is between the pivot and the point of the movable jaw, is to open this jaw, being actually the front jaw at this period of travel, and to hold it open until the reception-point is reached when, the roller passing out of the camway, the spring will close it against the rigid rear jaw, by which the fresh can-body will have been gathered. When said jaw is opened, the can-body is forced out by ejector-spring $d$, secured to the heel of said movable jaw.

Located opposite the point where the gripper-opening cam terminates is a feedway 30, through which the can-bodies are introduced into the path of the gripper-jaws. In the construction shown the can-bodies are supposed to have come down a runway from the fluxing-machine and to have been delivered to the inclined floor 31 and guiding-walls 32 of the feedway, ends up, each crowding the one in advance into the path of the rigid rear jaw of the grippers, the front jaw being at the moment open. Immediately the rear jaw catches the can-body before it, the front jaw is released from the cam and closes and securely clamps it thereagainst, and in the further advance of said grippers it is carried over the soldering-trough, dipped, and cooled, as presently explained, without once being released, until finally, having undergone the effective operations of the machine, it reaches the discharge-point. Here the roller on the movable jaw enters the chordal camway and opens said jaw; but the opening of the jaw will not of itself effect the removal of the can-body, although it gives it an initial push with the ejecting-spring, and as its discharge endwise into a chute by gravity might be harmful more considerate means are desirable. Such means are afforded by a revolving discharge-table 33, driven by bevel-gears 34 from the main shaft 35 and in such a direction and at such a speed that its outer annular reach, which projects over the solder-trough and forms a flooring to receive the can-bodies as they are released by the jaws, runs before and outstrips the speed of the grippers, so as to take the can-body away from the fixed jaw and carry it along the spirally carved guideway 39, the rear bars 40 of which extend across the path of the grippers to a connection with the opening cam and act as strippers or deflectors for said can-body while permitting the passage of said grippers until the outer side of the machine is reached, where it will be discharged into a runway leading to the can-heading mechanism or otherwise disposed of. The front walls of the guideway 39 are supported from the rear walls by bridge-brackets 41 and stop sufficiently short of the path of the grippers (as shown) to admit the can-bodies deposited on the revolving discharge-table by said grippers.

Rigidly secured to the fixed central spindle above the rotating carrier is a radial spider 42, bearing on the outer ends of its arms the cam-track 43, the perimeter of which is described on an arc concentric with the axis of said spindle. Opposite the feedway and discharge and for some distance preceding the latter this cam-track has a long elevated reach 44, lifting the gripper-arms, as in Fig. 4, to an inclination parallel with the inclination of the floor 31 of the feedway, so that the can-bodies may be grasped centrally by the grippers in a plane perpendicular to their axes, or parallel with the ends to be dipped. After leaving the feedway the elevated reach is succeeded by a depressed reach 45, that the gripper-arms may drop toward the surface of the molten solder, it being necessary that said surface and the arms should be approximated in some way to bring the end or edge to be dipped into the bath. This depressed reach is succeeded by a second elevated reach 46, which in case only one end of the can is to be dipped may coincide with and merge into the before-mentioned reach 44, but in the present construction is independent therefrom, since the machine is intended to dip both ends of the can-body one after the other. Upon being lifted by this second elevated reach 46 the gripper arm is rocked half-way around its horizontally-trending axis to invert the can-body and bring the end just dipped uppermost, so that in the further journey along said reach the solder may creep down from the edge and cool in a rib parallel thereto, leaving the edge and an annular band extending a short distance therefrom in proper condition to receive the head. A second depressed reach 47 succeeds this elevated reach 46, that the undipped and now lowermost end or edge may be in its turn immersed in the bath, after which the track reascends to the original elevated reach 44, the gripper-arm is again rocked half-way around its axis to invert the freshly-dipped edge, and the solder thereon is permitted to creep down and cool, as before, while the gripper is approaching its opening cam and the discharge-point.

The cam-track in this specific machine is arranged above the gripper-arms, and the latter are supported therefrom by floating brackets 48, Figs. 19 and 20, in the lower ends of which there is a bearing 49 for the gripper-shaft and which are provided at their upper ends with an overhanging truck or antifriction-roll 50, that sits over and travels on the cam-track. These floating brackets fit into and play up and down in the aforementioned vertical guideways 19, formed in brackets 20, bolted fast to the rim of the revolving carrier, so that the grippers are moved onward with said carrier as it rotates. The rear wall 51 of the guideways extends up nearly to the cam-track to brace the gripper-arms and shafts in all positions; but the front wall 52 is somewhat lower, so that the floating bearings may be lifted and disengaged from the guideways by swinging the gripper-arms forward on their swiveling connection with the carrier should this be for any reason necessary.

In order to impart the intermittent rocking movement to the gripper-shafts, gearing of any suitable nature, dependent upon whether the grippers are at the moment traveling or relatively stationary, will be employed. That which I have devised for the special machine described and illustrated herein as exponential of my invention is as follows: Mounted upon the central spindle in such manner as to be movable therearound and fixed relatively thereto are stop-arms 53, depending in number upon the number of times the can-body is to be inverted and dipped and extending above and beyond the track of the cam-spider, and at their outer ends bent down to receive clips 54, Figs. 24-26, carrying a short horizontal rack 55, and which may be vertically adjustable upon the depending extremities of said arms. As quick action is desired once the inversion commences, this rack is made to consist of but two pin-teeth or rundles, which may be covered with antifriction-sleeves, as shown, and a toothed gear 56, Fig. 23, of peculiar outline, hereinafter termed the "reversing-cam," is keyed to each gripper-shaft to coöperate therewith. This reversing-cam has but four teeth, two of which, 57 and 59, are of shoe shape, while the other two, 58 and 60, are forwardly curved and set alternately with the first two. Upon each gripper-shaft, adjacent to the floating bracket in which it is suspended, is also keyed a trapezoidal ratchet 61, having two teeth 62 63, respectively, corresponding to the notch behind each of the shoe-shaped teeth of said cam. This ratchet has prolonged plane surfaces or notches 64 behind each tooth and also plane surfaces 65 beyond each tooth, giving it a generally equilateral appearance, rounded at the corners, the object being to enable the spring-pressed pawl 66, pivoted to the adjacent floating bracket, to act more efficiently as a brake to prevent too great momentum being acquired, and to certainly engage behind each tooth in its turn and justify the position of the grippers by contact with the planes 64 through the pressure of its strong spring 67.

When the gripper leaves the feedway with a can-body grasped in its jaws, the pawl will be engaged, for instance, with the ratchet-tooth lying immediately behind the tooth 57 of the reversing-cam. In the advancing movement of the gripper and at the proper time, as immediately following the first dipping operation, the toe of this tooth will strike the first pin or stop of the rack, and the reversing-cam will be rotated in the direction of the arrow, bringing the succeeding tooth 58 into engagement with the second pin or stop of said rack to complete the semirotation of the gripper-shaft and withdrawing ratchet-tooth 63 from engagement with the pawl. In passing out of engagement with this second pin the heel of the shoe-tooth 59 contacts with said pin and prevents overrunning at the moment the pawl should drop behind the second ratchet-tooth 62, thus insuring the stopping of rotation and locking of the gripper-shaft at the moment the can-body is perpendicular.

In the present construction one stop-arm is shown for each elevated reach of the cam-track and about at the commencement thereof, so that the gripper-shafts are rocked after each dipping; but it is evident that this depends entirely upon the nature and distribution of the contents of the trough 14 and the purpose of the dipping. Should it be proposed to flux the ends of the can-bodies in the machine preliminarily to dipping, the trough 14 would necessarily be stationary, and the first reach of the trough, corresponding to the first depressed reach of the cam-track, would be filled with fluxing material, and the second reach of the trough, corresponding with the second depressed reach of the cam, would contain molten solder, and the stop-arm above the elevated cam-reach between would be omitted or made inoperative by detaching its pin-rack.

For the purpose of advancing or retarding the reversal of the can-body after the dipping is effected, that the cooling of the solder may take place to a less or greater degree before inversion, the stop-arms are, as already intimated, made adjustable. To this end a segment-plate 68, Figs. 27, 28, is supported by studs 69 at each of its ends in bosses 70 upon and above the cam-spider, Fig. 12, and the corresponding stop-arm 53 passes beneath said plate and between the studs or pillars thereof, so as to be limited in its movement in either direction by said studs. A clip 71 upon the stop-arm engages with the curved edge of the segment-plate and is clamped down thereon by bolt and nuts 72, Figs. 24, 25, to hold the arm in any desired angular adjustment, thus determining the moment relatively to other operations at which the can-body is inverted. The bosses 73 upon the cam-spider are for the support of the gripper-opening cam.

When the trough 14 revolves with the gripper-arms as herein proposed and is unbroken throughout its circuit and filled with molten solder, scum and dross on the surface of the solder may be held back of the dipping-points by means of a skimmer or skimmers 74, Figs. 32, 33, consisting in its simplest form of a handle-bar 75, notched to take over a screw-stud 76 on a stationary part of the frame and to be clamped thereto by a lever-nut 77 and having a depending blade 78, which enters and extends across the trough and serves as a gate behind which scum is dammed up and accumulates until removed with a scoop. The molten matter emerging beneath this gate and carried by the revolution of the trough to the dipping-point immediately beyond will be entirely clear and in the best condition possible for contact with the fluxed edges of the can-body.

If it is desired to use the apparatus for both fluxing and soldering, as hereinbefore suggested, the trough may be detached from the table and supported entirely upon brackets 79, (shown in dotted lines in Fig. 7,) these brackets being adjustably secured to certain of the standards $b$. The trough will also be divided off, as indicated by dotted lines 80, Figs. 1 and 2, into receptacles 81 82, respectively, for fluxing material and for solder, and the burners will be suitably adjusted or controlled.

This invention is intended as a means for carrying out mechanically certain steps in the process invented by me and made the subject-matter of my application filed March 9, 1900, Serial No. 7,955, and having grown out of said latter invention, and being, so far as I am aware, radically new I do not intend to limit myself herein to specific details of mechanism nor to the employment of constantly-rotating grippers or solder-trough, nor in any way to restrict my right to a broad interpretation of the invention, intending also by the terms "can-bodies" and "solder-trough" or words of like import in the ensuing claims to embrace any bodies which may be subjected to dipping in the same way as the can-bodies herein specifically described, and a trough holding a bath of any nature congruent to the other elements of the claim in which said bodies are to be dipped.

Having thus described my invention, what I claim, and desire to secure by Letters Patent, is—

1. A machine for dipping the uncovered ends of can-bodies and the like, comprising a trough for holding the bath into which they are to be dipped, traveling grippers which take and carry the can-bodies over said bath, mechanism whereby said grippers are automatically caused to approximate the surface of said bath with the can held in a vertical direction, to evenly dip the exposed ends of the can-bodies, and then depart from said surface, mechanism reversing the grippers a half-rotation while elevated away from the bath, and mechanism automatically opening the gripping-jaws toward the end of their traverse to release said bodies.

2. The combination with a trough for holding a bath into which the uncovered ends of can-bodies and the like are to be dipped, of traveling grippers which take and carry said bodies over the bath, automatic mechanism actuating said grippers to dip first one end of the can-body and then the other perpendicularly into the bath, and mechanism automatically opening said grippers toward the termination of their traverse after the final dipping, to release the can-bodies.

3. The combination with a trough holding a bath, of traveling grippers which take and carry can-bodies thereover, mechanism automatically actuating said grippers to present and dip one end of the can and then the other perpendicularly in the bath, mechanism automatically elevating the grippers after each dipping operation, and mechanism automatically opening the grippers after the final dipping and reversal.

4. The combination with an annular trough for holding solder or other material, of a series of grippers above said trough and traveling around the axis thereof, a feedway delivering can-bodies to the open grippers, automatic mechanism causing said grippers to close upon and grasp said bodies while passing said feedway, mechanism whereby said grippers are automatically approximated to the surface of the solder to dip the ends of the can-bodies perpendicularly therein, and then removed therefrom, mechanism automatically rocking the grippers on their horizontally-trending axes after an end has been dipped, and mechanism whereby the grippers are automatically opened toward the end of the circuit.

5. The combination with an annular trough for holding material into which the uncovered ends of can-bodies are to be dipped, of a series of grippers above said trough and traveling around the axis thereof, a feedway delivering can-bodies in an upright position to the open grippers, a cam-track supporting said grippers in their journey and having depressed and elevated reaches to cause them to dip and rise to immerse the ends of the can-bodies perpendicularly in an upright position in the contents of the trough and lift them therefrom, means for giving said grippers a semirotation on their horizontally-trending axes while elevated in intervals between dipping, and means for automatically releasing the can-bodies from said grippers.

6. The combination with an annular trough for holding solder or like material, of a series of grippers overhanging said trough, means for concurrently and coördinately revolving said trough and grippers around a vertical axis, a feedway delivering can-bodies into the path of the grippers, means whereby said grippers are caused to grasp the can-bodies as they pass the feedway, means whereby the grippers are caused to descend toward the trough to dip the ends of said can-bodies and then rise away therefrom, means for giving the grippers a semirotation on their longitudinally-trending axes while elevated away from the trough, and means whereby the can-bodies are discharged from the grippers after the final dipping.

7. The combination with an annular trough for holding a bath into which the ends of can-bodies are to be dipped, of a series of grippers overhanging said trough, means for concurrently and coördinately revolving said trough and grippers around a vertical axis, a circular cam-track with depressed and elevated reaches, by which said grippers are supported in their journey and whereby they are caused to fall toward the bath and rise away therefrom to dip the ends of the cans and lift them clear of the bath, means for imparting a semirotation to the grippers while raised, and means for discharging the dipped bodies.

8. The combination with an annular trough for holding a bath into which the ends of can-bodies are to be dipped, of a series of grippers overhanging said trough, means for concurrently and coördinately revolving said trough and grippers around a vertical axis, a circular cam-track with elevated and depressed reaches by which said grippers are supported in their journey and whereby they are caused to fall toward the bath and rise away therefrom, means for imparting a semirotation to the grippers while raised, means for varying the point at which said semirotation is effected, and means for discharging the dipped bodies.

9. The combination with the solder-trough and the grippers revolving about the axis thereof, of the revolving table to which the grippers deliver the can-bodies, and means for driving said table at a greater speed than the speed of the grippers.

10. The combination with the solder-trough and the grippers revolving about the axis thereof, of the revolving table to which the grippers deliver the can-bodies, the spirally-curved guideway above said table, and mechanism driving said table at a speed greater than the speed of the grippers.

11. The combination with the solder-trough and concentric stationary cam-track, of the revolving carrier, the sleeve-arms pivoted to lugs carried thereon, the gripper-shafts mounted in said arms, and supported by the cam-track, the gripper-jaws at the outer ends of said shafts adapted to receive the can-bodies in an upright position and automatically dip their edges in essentially perpendicular lines coincidently with the depressions in said cam-track, a rack or racks for giving said gripper-shafts a semirotation at definite points in the revolution of the carrier, and locking devices for holding them against rotation in the intervals between engagement with said rack or racks.

12. The combination with the solder-trough and concentric stationary cam-track, of the revolving carrier, the sleeve-arms pivoted to lugs carried thereon, the gripper-shafts mounted in said arms, and supported by the cam-track, the gripper-jaws at the outer ends of said shafts, floating bearing-brackets in the lower ends of which said shafts are journaled and having trucks at their upper ends taking over the cam-track, pawls upon said brackets and ratchet-disks upon the shafts to lock said shafts against movement, toothed gears on said shafts, and stationary racks or stops in the path of said gears, whereby said shafts are intermittently rocked as they revolve with the carrier.

13. The combination with the revolving carrier and concentric stationary cam-track, of sleeve-arms hinged to lugs upon said carrier to have a rising-and-falling movement following the outlines of the cam-track, gripper-shafts mounted in said arms, gripper-jaws at the outer ends of said shafts, floating bearing-brackets in the lower ends of which said shafts are journaled and which carry trucks at the upper end taking over said cam-track, and vertical guide-brackets fixed to the outer rim of the carrier and receiving said floating bearing-brackets.

14. The combination with the revolving carrier and concentric stationary cam-track, of swiveling bracket-lugs secured thereto by a vertical pivot-bolt, sleeve-arms hinged to said swiveling bracket-lugs, gripper-shafts borne in said arms, gripper-jaws at the outer ends of said shafts, floating bearing-brackets in the lower ends of which said shafts are journaled and which carry trucks at the upper end taking over said cam-track, and vertical guide-brackets fixed to the outer rim of said carrier to receive and direct said floating brackets, and cut away at the forward side to permit the gripper-arm to be swung upon its swiveling connection.

15. The combination with the revolving carrier and with gripper-arms hinged thereto to have a rising-and-falling movement, of a cam-track whereby the outer ends of said arms are automatically caused to rise and sink, a feedway opposite an elevation of said cam-track, and an inclined flooring to said feedway, parallel with the inclination of the gripper-arm lifted by said elevation, lateral guards above said flooring directing the can-bodies to the grippers on an upright position, and means for giving said grippers a semirotation succeeding each rising movement.

16. The combination with the rotating carrier and gripper-arms borne thereby, and with the fixed rear jaw and spring-held pivoted front jaw of the grippers, of the gripper-opening cam arranged as a chord to the arc in which said jaws are swept, and acting upon a pin or roller from said front jaw, and the spring for holding said jaws normally closed.

17. The combination with the rotating carrier and grippers borne thereby, of the stop-arms and the pin racks or stops at their outer ends, the adjusting-segments, and the clamps whereby said arms are secured to said segments.

18. The combination with the rotating carrier and a sleeve-arm pivoted to lugs therefrom, of the gripper-shaft journaled in said arm, the reversing-cam of the outline described keyed to said shaft the double-toothed pin-rack for operating said cam, and the pawl and double-toothed ratchet for locking the shaft.

19. The combination with the rotating carrier and a sleeve-arm pivoted to lugs therefrom, of the gripper-shaft journaled in said arm, the reversing-cam of the outline described keyed to said shaft, the double-toothed pin-rack, the locking-pawl, and the trapezoidal ratchet having two teeth with intermediate plane surfaces whereby said pawl is enabled to act as a brake upon the shaft.

20. The combination with the rotating annular solder-trough, of the stationary burner-ring, and the adjustable brackets therefor.

21. The combination with a solder-bath, of means for dipping the end edge of a can-body therein and turning the dipped edge uppermost before the solder thereon sets to allow it to creep down and form a rib-like deposit removed from the extreme end edge of the can-body, substantially as specified.

22. The combination with means for applying molten solder to the end of a can-body of means for holding the can-body with its molten-solder-coated end uppermost before and while the solder thereon sets to allow the solder to creep down and form a rib-like deposit removed from the extreme end edge of the can-body and seam-section, substantially as specified.

23. The combination with means for applying molten solder to the end of a can-body of means for turning the can-body into a position with its molten-solder-coated end uppermost before the solder thereon sets and holding its solder-coated end uppermost while the solder sets to allow the solder to creep down and form a rib-like deposit removed from the extreme end edge of the can-body and seam-section, substantially as specified.

24. The combination with means for applying molten solder to the edge of a piece of sheet metal, of means for holding said sheet-metal piece with its molten-solder-coated edge uppermost before and while the solder thereon sets to allow the solder to creep down and form a rib-like deposit removed from the extreme edge of the sheet-metal piece and seam-section, substantially as specified.

25. The combination with a solder-bath of means for dipping the edge of a piece of sheet metal therein and means for turning the same with its dipped edge uppermost before the solder thereon sets and holding it in such position to allow the solder to flow down and form a rib-like deposit removed from the extreme edge of the piece, substantially as specified.

26. In combination, means for applying molten solder to a sheet-metal piece and means for turning the sheet-metal piece with the solder-coated end uppermost before and while the solder thereon sets to allow the solder to creep down and form a rib-like deposit removed from the extreme edge of the piece and seam-section, substantially as described.

27. In combination with a solder-bath, means for dipping the edge of a piece of sheet metal therein and for turning the molten-solder-coated edge uppermost before the solder thereon sets to allow it to creep down and form a rib-like deposit removed from the extreme edge of the piece and seam-section and means whereby the metal pieces are automatically supplied to and discharged from the dipping means, substantially as described.

28. A machine for forming on a piece of sheet metal a plurality of rib-like deposits of solder comprising means for applying molten solder to first one edge of the piece and then the other and for holding the piece with its newly solder-coated edge uppermost before and while the solder thereon sets to allow the solder to creep down and form a rib-like deposit removed from the extreme edge of the metal piece and seam-section, substantially as described.

29. A machine for forming on a piece of sheet metal a plurality of rib-like deposits of solder comprising means for applying molten solder to different edges of the piece and for moving the piece so that its solder-coated edges will be uppermost before and while the solder sets to allow the solder to creep down and form rib-like deposits removed from the extreme edges and seam-sections of the piece, substantially as described.

30. A machine for forming rib-like deposits on different edges of sheet-metal pieces, said means including a bath and means for holding the sheet-metal piece and for inverting it after each immersion of an edge so that the newly-coated edge will be held uppermost before the solder thereon sets to allow it to creep down and form the rib-like deposit removed from the extreme edge of the piece and seam-section, substantially as described.

31. Means for forming a rib-like deposit of solder on a piece of sheet metal consisting of means for applying molten solder to the edge portion of said piece and means for holding said piece with its molten-solder-coated edge uppermost and in a substantially horizontal plane before the solder sets to allow the solder to creep down and form a rib-like deposit removed from the edge and seam-section and parallel to said edge, substantially as described.

32. Means for forming a rib-like deposit on a sheet-metal piece including a solder-bath and a holder for the piece and means whereby the sheet-metal piece is dipped into the bath with its edge in substantially a horizontal plane and for turning the said piece with its molten-solder-coated edge uppermost before and while the solder thereon sets while maintaining the horizontal position of the edge to allow the solder to creep down and form a rib-like deposit removed from the extreme edge and seam-section and parallel to said edge, substantially as described.

33. In combination with a traveling bath, means traveling in unison therewith for automatically dipping a sheet-metal piece into the bath and removing it therefrom, substantially as described.

34. In combination with a traveling bath, means traveling in unison therewith for automatically dipping a sheet-metal piece into the bath and removing it therefrom and for inverting the piece so that the dipped edge will lie uppermost before the solder thereon sets to allow said solder to creep down and form a rib-like deposit removed from the edge and seam-section, substantially as described.

35. In combination, a bath, carrier means for the sheet-metal pieces, said bath and carrier having a traveling movement in unison, in substantially a horizontal plane and one of said parts having in addition to its traveling movement a movement to cause the dipping of the sheet-metal piece into the bath and its removal therefrom with the edge of said piece maintained during said operation in a horizontal plane.

36. In combination with a bath, a series of traveling grippers, a feedway delivering the pieces to be dipped to the grippers, means for moving the grippers toward and from the bath with the edges of the pieces in a substantially horizontal plane, and means for turning the grippers before the molten-solder coating sets on the pieces to present the coated edge uppermost and horizontal so that the molten solder is allowed to creep down and form a rib-like deposit removed from the edge and seam-section and parallel to said edge, substantially as described.

37. In combination, a solder-bath, a gripper, means for delivering metal pieces to the grippers in upright position, means for operating the grippers to dip the piece in the solder-bath and then turn it with its molten-solder-coated portion uppermost before the solder sets to allow the solder to creep down and form a rib-like deposit removed from the edge and seam-section, substantially as described.

38. In combination, a solder-bath, automatically-operating grippers for seizing the metal pieces, automatic means for depressing the grippers to dip the edge of the metal pieces into the solder, automatic means for turning the grippers to invert the metal piece so that its molten-solder-coated edge lies uppermost before and while the solder sets to allow the solder to creep down and form a rib-like deposit removed from the edge and seam-section and means for operating the grippers to release the metal pieces, substantially as described.

39. In combination, a solder-bath, automatically-operating grippers for seizing the metal pieces, automatic means for depressing the grippers to dip the edge of the metal pieces into the solder, automatic means for raising and then turning the grippers to invert the metal piece so that its molten-solder-coated edge lies uppermost before and while the solder sets to allow the solder to creep down and form a rib-like deposit removed from the edge and seam-section and means for operating the grippers to release the metal pieces, substantially as described.

40. In combination, a solder-bath, automatically-operating grippers for seizing the metal pieces, automatic means for depressing the grippers to dip the edge of the metal piece into the solder, automatic means for turning the grippers to invert the metal piece so as to dip the other edge and to make its molten-solder-coated edge lie uppermost before the solder sets to allow the solder to creep down and form a rib-like deposit removed from the edge and seam-section, and means for raising the grippers and giving them another turning movement to make the last-coated edge assume an uppermost position for the formation of the rib-like deposit thereon, substantially as described.

41. In combination with a bath, traveling grippers for manipulating the sheet-metal pieces in connection with the bath and traveling discharge means moving at a greater rate of speed than the grippers, substantially as described.

42. In combination, a solder-bath, grippers for dipping the metal pieces into and removing them from the bath and means for opening and closing the said grippers, said grippers having means for giving the piece an initial discharging impulse when the gripper opens, substantially as described.

GEORGE WILCOX.

Witnesses:
G. G. JOHNSON,
T. A. CHAFFEE.